United States Patent
Niss et al.

(10) Patent No.: US 12,540,600 B2
(45) Date of Patent: Feb. 3, 2026

(54) METHOD FOR OPERATING A WIND TURBINE AND WIND TURBINE

(71) Applicant: Nordex Energy SE & Co. KG, Hamburg (DE)

(72) Inventors: Michael Niss, Arden (DK); Detlef Drossel, Norderstedt (DE); Jacob Laborenz, Hannover (DE); Valeri Buller, Hörstel (DE); Björn Phan-Graebitz, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/622,550

(22) Filed: Mar. 29, 2024

(65) Prior Publication Data

US 2024/0337248 A1 Oct. 10, 2024

(30) Foreign Application Priority Data

Apr. 4, 2023 (EP) .................................... 23166535

(51) Int. Cl.
*F03D 7/02* (2006.01)
*F03D 17/00* (2016.01)

(52) U.S. Cl.
CPC ......... *F03D 7/0298* (2023.08); *F03D 7/0224* (2013.01); *F03D 7/0264* (2013.01); *F03D 7/0276* (2013.01); *F03D 7/028* (2013.01); *F03D 7/0204* (2013.01); *F03D 7/022* (2013.01); *F03D 17/011* (2023.08); *F03D 17/015* (2023.08); *F03D 17/028* (2023.08); *F05B 2260/96* (2013.01); *F05B 2270/101* (2013.01);

(Continued)

(58) Field of Classification Search
CPC combination set(s) only.
See application file for complete search history.

(56) References Cited

U.S. PATENT DOCUMENTS

2009/0169378 A1    7/2009  Menke
2009/0266160 A1*  10/2009  Jeffrey ................ F03D 17/00
                                                  73/455

(Continued)

FOREIGN PATENT DOCUMENTS

CN           114718811 A       7/2022
DE    10 2018 116 941 A1      1/2020

(Continued)

OTHER PUBLICATIONS

Extended European search report of the European Patent Office dated Sep. 28, 2023 in application No. EP 23166535.7 on which the claim of priority is based.

*Primary Examiner* — Binh Q Tran
(74) *Attorney, Agent, or Firm* — Walter Ottesen, P.A.

(57) ABSTRACT

According to an embodiment, the method is for operating a wind turbine having a rotor with at least one rotor blade and a setting system which is configured to change the operation of the wind turbine. The method includes a step in which first trigger information is provided, wherein the first trigger information is representative of whether the torsional movement of at least one rotor blade exceeds a threshold. If this is the case, a first output signal is generated which is configured to cause the setting system to change the operation of the wind turbine in order to reduce the torsional movement of the at least one rotor blade.

11 Claims, 5 Drawing Sheets

(52) U.S. Cl.
    CPC . *F05B 2270/1032* (2013.01); *F05B 2270/331* (2013.01); *F05B 2270/332* (2013.01); *F05B 2270/334* (2013.01); *F05B 2270/335* (2013.01); *F05B 2270/80* (2013.01)

(56) References Cited

U.S. PATENT DOCUMENTS

| | | | |
|---|---|---|---|
| 2010/0014981 A1* | 1/2010 | McGeer | B64C 27/473 416/240 |
| 2010/0098540 A1 | 4/2010 | Fric et al. | |
| 2011/0049890 A1* | 3/2011 | Castell Martinez | F03D 15/10 290/44 |
| 2012/0024053 A1 | 2/2012 | Cheng | |
| 2013/0177417 A1 | 7/2013 | Olesen | |
| 2013/0195657 A1 | 8/2013 | Lauritsen et al. | |
| 2014/0308122 A1 | 10/2014 | Castro | |
| 2014/0367967 A1* | 12/2014 | Ossyra | F03D 7/0248 290/44 |
| 2017/0335828 A1 | 11/2017 | Mueller et al. | |
| 2017/0356425 A1* | 12/2017 | Narayanan | F03D 17/00 |
| 2018/0187647 A1* | 7/2018 | Perley | F03D 7/0224 |
| 2019/0003461 A1 | 1/2019 | Zhou et al. | |
| 2019/0154001 A1 | 5/2019 | Ostergaard et al. | |
| 2020/0088165 A1* | 3/2020 | Nielsen | F03D 7/0224 |
| 2020/0158084 A1* | 5/2020 | Caponetti | F03D 9/25 |
| 2021/0340963 A1 | 11/2021 | Munoz Babiano et al. | |
| 2022/0260053 A1* | 8/2022 | Caponetti | F03D 7/028 |
| 2022/0389905 A1* | 12/2022 | Hansen | F03D 7/042 |

FOREIGN PATENT DOCUMENTS

| | | |
|---|---|---|
| EP | 1 748 185 A1 | 1/2007 |
| EP | 2 075 462 A2 | 7/2009 |
| EP | 2 177 754 A2 | 4/2010 |
| EP | 2 549 454 A2 | 1/2013 |
| EP | 2 559 894 A1 | 2/2013 |
| EP | 2 588 752 B1 | 7/2015 |
| EP | 2 593 672 B1 | 3/2017 |
| EP | 2 984 339 B1 | 6/2017 |
| EP | 3 460 237 A1 | 3/2019 |
| EP | 3 227 690 B1 | 6/2019 |
| WO | 2013/032135 A1 | 3/2013 |
| WO | 2020/057876 A1 | 3/2020 |

* cited by examiner

METHOD FOR OPERATING A WIND TURBINE AND WIND TURBINE

CROSS-REFERENCE TO RELATED APPLICATIONS

This application claims priority of European patent application no. 23166535.7, filed Apr. 4, 2023, the entire content of which is incorporated herein by reference.

TECHNICAL FIELD

The present disclosure relates to a method for operating a wind turbine. Furthermore, the present disclosure relates to a computer program, a computer-readable data carrier, a control device, a control system and a wind turbine.

BACKGROUND

Wind turbines are widely known and are used to convert wind energy into electrical energy. The lengths of the rotor blades used in such wind turbines have increased in recent years. Torsional vibrations of the rotor blades, which can be caused by stall or by another source of excitation, lead to a risk of structural damage of the rotor blades. Furthermore, torsional vibrations of the rotor blades cause undesired loads on other wind turbine structural components, such as the pitch bearings, the rotor hub, the drive train, the machine frame, the yaw bearing and/or the tower, thus leading to a risk of structural damage of the wind turbine components.

SUMMARY

One object to be achieved is to provide an improved method for operating a wind turbine, for example a method which increases the lifetime of the rotor blade and/or other components of the wind turbine. Further objects to be achieved are to provide a computer program, a computer-readable data carrier, a control device and a control system for providing such a method as well as a wind turbine with which this method can be executed.

First, the method for operating a wind turbine is specified.

According to an embodiment, the method is for operating a wind turbine having a rotor with at least one rotor blade and a setting system which is configured to change the operation of the wind turbine. The method includes a step in which first trigger information is provided, wherein the first trigger information is representative of whether the torsional movement of at least one rotor blade exceeds a threshold. If this is the case, that is, if the first trigger information is representative of the torsional movement of at least one rotor blade to exceed the threshold, a first output signal is generated which is configured to cause the setting system to change the operation of the wind turbine in order to reduce the torsional movement of the at least one rotor blade.

The present invention is, inter alia, based on the recognition that stalling blades, especially when the rotor blades are covered with ice, can lead to torsional blade vibrations and this can lead to a dangerous operation. With the present invention, torsional vibrations are detected and the wind turbine is set to a safe operation if the torsional vibrations exceed a threshold.

The method specified herein is, in particular, a computer implemented method, that is, is performed by a computer or a processor.

Herein, when information is representative of a certain quantity or certain quantities, this means that the quantity or quantities can be extracted from the information, either directly, or the quantity/quantities can at least be derived from the information. In other words, the quantity/quantities is/are stored in the information, or at least data are stored in the information, from which the quantity/quantities can be derived or determined or calculated, respectively. Furthermore, here and in the following, information is, in particular, electronic information, like electronic data.

The first trigger information is representative of whether the torsional movement of at least one rotor blade, in particular a torsional vibration of at least one rotor blade, exceeds a threshold. This threshold is herein also referred to as first threshold. The first threshold is, for example, a predetermined threshold. Particularly, the first trigger information is representative of whether the torsional movement exceeds the first threshold while the rotor is rotating. By way of example, the first trigger information is either 0 or 1, with 0 meaning that the first threshold is not exceeded and 1 meaning that the first threshold is exceeded.

The first trigger information may be determined repeatedly, for example, periodically. For example, the first trigger information is determined with a frequency of at least 1 Hz or at least 10 Hz or at least 100 Hz.

The first trigger information is, in particular, representative of the current situation in the wind turbine. For example, the first trigger information is determined from measurements. The measurements used for determining the first trigger information were taken, for example, at most 1 s or at most 0.1 s before determining the first trigger information.

The first trigger information may additionally be representative of the number of rotor blades where the respective torsional movement exceeds a respective (first) threshold. The (first) thresholds for the different rotor blades may be the same. That is, in the case that there is more than one rotor blade, for each rotor blade it is monitored whether the respective torsional movement exceeds the respective threshold. For example, the first output signal is generated already if the first trigger information is representative of the torsional movement of one rotor blade to exceed the respective threshold. Alternatively, the first output signal is only generated if the first trigger information is representative of the torsional movements of two or more rotor blades to exceed the respective thresholds. That is, the condition that the first trigger information must be representative of the torsional movement of at least one rotor blade to exceed the threshold is a necessary condition for the first output signal to be regenerated. It may or may not be a sufficient condition.

The torsional movement of the rotor blade is a movement in a reference frame which rotates together with the rotor blade, herein called "rotating reference frame". Thus, the speed of rotation of the rotating reference frame is the same as the speed of rotation of the rotor blade(s).

The first output signal is generated if, particularly only if, the first trigger information is representative of the torsional movement of at least one rotor blade to exceed the threshold. The first output signal is, in particular, an electric signal which can be transmitted via a wire or wirelessly. The first output signal is configured to cause the setting system to change the operation of the wind turbine. That is, the first output signal includes information which can be evaluated by the setting system and can be translated by the setting system into a change of operation.

The generation of the first output signal and, optionally, also the change of the operation of the wind turbine, may be carried out in real time. For example, it is carried out/started within a time interval of at most 50 ms, 100 ms or 200 ms after the first trigger information has been determined to be representative of the torsional movement of at least one rotor blade to exceed the threshold.

According to a further embodiment, the method further includes a step of providing first base information which is representative of the pitch angle of the at least one rotor blade. For example, the first base information is representative of the pitch angle of the at least one rotor blade as a function of time or over time, respectively. In the case of two or more rotor blades, the first base information may be representative of the pitch angle of each of the rotor blades, for example, as a function of time. The first base information is, for example, a measurement signal.

According to a further embodiment, the first trigger information is determined depending on the first base information. Indeed, the detection of a change in the pitch angle, for example, a periodic change of pitch angle with a certain frequency, which is not induced by purpose, can be an indication of a torsional movement or torsional vibration of the rotor blade.

According to a further embodiment, the first base information is determined depending on measurements taken with the help of a first sensor system. The first sensor system is configured to measure the pitch angle of the at least one rotor blade.

The first sensor system is, for example, part of the wind turbine. The first sensor system includes, for example, at least one encoder sensor, like an optical encoder sensor or a magnetic encoder sensor. The encoder sensor may be located at the pitch bearing, for example. Additionally or alternatively, the first sensor system may include the motor for changing the pitch angle. The electrical signal generated by the motor can be used to determine the pitch angle.

According to a further embodiment, determining the first trigger information includes applying at least one filter to the first base information in order to extract an oscillation of the pitch angle of the at least one rotor blade with the torsional eigenfrequency of the at least one rotor blade. The filter may include a bandpass filter. For example, the torsional eigenfrequency is between 5 Hz inclusive and 10 Hz inclusive or between 7 Hz inclusive and 8 Hz inclusive.

According to a further embodiment, determining the first trigger information includes determining whether an amplitude of the oscillation of the pitch angle with the torsional eigenfrequency exceeds a threshold, herein called "oscillation threshold". For example, if it is determined that the amplitude of the oscillation with the torsional eigenfrequency of at least one rotor blade exceeds the oscillation threshold, the first trigger information is determined to be representative of the torsional movement of this rotor blade to exceed the threshold. In particular, after applying the bandpass filter, the resulting absolute value of the extracted signal can be taken and a low pass filter can be applied in order to determine whether the amplitude exceeds the oscillation threshold.

According to a further embodiment, the method further includes providing second base information. The second base information is representative of the torsional bending moment acting on the at least one rotor blade, particularly for the torsional bending moment as a function of time or over time, respectively. In the case of two or more rotor blades, the second base information may be representative of the torsional bending moment acting on each of the rotor blades, for example, as a function of time. The second base information may be a measurement signal.

Bending moments acting on the rotor blade are quantities in the rotating reference frame. Three orthogonal bending moments can act on the rotor blade, namely an edgewise bending moment, a flapwise bending moment and the torsional bending moment.

According to a further embodiment, the first trigger information is determined depending on the second base information. Measuring the torsional bending moment is a direct way to detect torsional blade movements.

Also here, a filter may be applied to the second base information in order to extract an oscillation of the torsional bending moment with the torsional eigenfrequency. If the amplitude of this filtered signal exceeds a threshold, herein called "torsional bending moment threshold", the first trigger information may be determined to exceed the threshold.

According to a further embodiment, the second base information is determined depending on measurements taken with the help of a second sensor system.

According to a further embodiment, the second sensor system includes one or more strain sensors for measuring the torsional bending moment of the at least one rotor blade. The second sensor system is, for example, part of the wind turbine. The strain sensors are, for example, optical fiber sensors or strain gauge sensors. Each rotor blade may be assigned at least one strain sensor for measuring the torsional bending moment. The strain sensors for measuring the torsional bending moment may, in each case, be located at the blade root. Particularly, the strain sensor for measuring the torsional bending moment is especially configured for detecting the torsional bending moment and/or is especially positioned and/or especially orientated for measuring for detecting the torsional bending moment.

According to a further embodiment, the method includes a step of providing a third base information and/or a step of providing a fourth base information. The third base information is representative of the edgewise bending moment, for example, as a function of time, acting on the at least one rotor blade. The fourth base information is representative of the flapwise bending moment acting on the at least one rotor blade, for example, as a function of time. In the case of two or more rotor blades, the third and the fourth base information may be representative of the edgewise bending moment and the flapwise bending moment acting on each of the rotor blades. The third base information and/or the fourth base information may be measurement signals.

According to a further embodiment, the first trigger information is determined depending on the third and/or the fourth base information. Using the information about the edgewise and/or flapwise bending moment is an indirect way to detect torsional blade vibrations. Since the rotor blade has properties which differ from those of an ideal beam, edgewise and/or flapwise bending moments cause blade deformations, which also include torsional deformations. This is the so-called "bend twist coupling". Therefore, edgewise and/or flapwise bending moments can be used to determine torsional vibrations or torsional movements, respectively. The benefit of using the edgewise and/or the flapwise bending moments is that already existing strain sensors can be used. No extra strain sensor for detecting the torsional bending moments are needed.

Also in these cases, a filter may be applied to the third and/or fourth base information in order to extract an oscillation of the edgewise or flapwise bending moment with the torsional eigenfrequency. If the amplitude of this filtered signal exceeds a threshold, herein called "edgewise bending moment threshold" or "flapwise bending moment threshold", the first trigger information may be determined to exceed the threshold.

According to a further embodiment, the third base information and/or the fourth base information are determined depending on measurements taken with the help of a third sensor system and/or a fourth sensor system. The third and/or the fourth sensor system may be part of the wind turbine.

According to a further embodiment, the third sensor system includes at least one strain sensor for measuring the edgewise bending moment of the at least one rotor blade. The fourth sensor system may include at least one strain sensor for measuring the flapwise bending moment of the at least one rotor blade. The strain sensors for measuring the edgewise and/or flapwise bending moments are, for example, strain gauge sensors or optical fiber sensors. Each rotor blade may be assigned at least one strain sensor for measuring the edgewise bending moment and/or at least one strain sensor for measuring the flapwise bending moment. The strain sensors for measuring the flapwise and/or edgewise bending moments may, in each case, be located at the blade root.

According to a further embodiment, the method includes a step of providing a fifth base information which is representative of an angular acceleration of the at least one rotor blade, particularly as a function of time or over time, respectively. In particular, the fifth base information is representative of an angular acceleration of the at least one rotor blade at the tip of the at least one rotor blade. In the case of two or more rotor blades, the fifth base information may be representative of the angular acceleration of each of the rotor blades. Also this fifth base information may be a measurement signal. The "angular acceleration" is an acceleration in the torsional movement of the blade.

According to a further embodiment, the first trigger information is determined depending on the fifth base information. Also here, as in the previous cases, a filter may be applied to extract an oscillation of the angular acceleration with the torsional eigenfrequency. If the amplitude of this filtered signal exceeds a threshold, herein called "angular acceleration threshold", the first trigger information may be determined to exceed the threshold.

According to a further embodiment, the fifth base information is determined depending on measurements taken with the help of a fifth sensor system. Also the fifth sensor system may be part of the wind turbine.

According to a further embodiment, the fifth sensor system includes at least one acceleration sensor for measuring the angular acceleration of the at least one rotor blade. The acceleration sensor may be a gyroscopic accelerometer. For example, each rotor blade is assigned at least one acceleration sensor. In each case, the acceleration sensor may be located away from the blade root, for example, at the blade tip.

According to a further embodiment, the setting system is configured to execute at least two different measures for reducing the torsional movement of the at least one rotor blade. The two different measures are conceptually different, that is, they change different properties of the wind turbine.

According to a further embodiment, the first output signal is configured to cause the setting system to execute a first measure for reducing the torsional movement of the at least one rotor blade.

According to a further embodiment, the method further includes a step of providing a second trigger information. The second trigger information is representative of whether the torsional movement of at least one rotor blade exceeds a threshold after the first measure has been executed. The threshold for the second trigger information, herein also called "second threshold", may be the same or may be smaller or may be greater than the first threshold of the first trigger information.

The second trigger information may be determined in the same way as the first trigger information. All features disclosed for the first trigger information are also disclosed for the second trigger information. Particularly, the second trigger information may be determined depending on the first base information and/or on the second base information and/or on the third base information and/or on the fourth base information and/or on the fifth base information.

However, the first trigger information and the second trigger information represent different moments in time. The second trigger information represents a moment in time after the moment in time represented by the first trigger information that caused the first output signal and, particularly, a moment in time after the first measure has been executed.

According to a further embodiment, if the second trigger information is representative of the torsional movement of at least one rotor blade to exceed the (second) threshold, a second output signal is generated which is configured to cause the setting system to execute a second measure for reducing the torsional movement of the at least one rotor blade. The second measure is conceptually different from the first measure.

The second measure shall, in particular, be executed in the case that the first measure has not led to the desired result, that is, a sufficient reduction of the torsional movement. In order to allow the first measure to develop its effect, the second trigger information may be provided/determined with a sufficient time gap to the execution of the first measure. For example, the second trigger information is provided/determined earliest after at least 3 s or at least 5 s or at least 10 s after the first output signal has been generated and/or after the first measure has been executed.

Like for the first output signal, the generation of the second output signal and, optionally, also the execution of the second measure, may be carried out in real time. For example, it is carried out/started within a time interval of at most 50 ms, 100 ms or 200 ms after the second trigger information has been determined to be representative of the torsional movement of at least one rotor blade to exceed the (second) threshold.

The second measure is, for example, more aggressive than the first measure. This means, for example, that the second measure is expected to reduce the torsional movement of the rotor blade(s) more strongly than the first measure. For example, the second measure reduces the electrical power output of the wind turbine more than the first measure.

According to a further embodiment, each of the first measure and the second measure is one, but not the same, of: changing, particularly increasing, the pitch angle of the at least one rotor blade; changing, particularly reducing, the speed of rotation of the rotor without stopping the rotation of the rotor; changing, particularly reducing, the electrical power output of the wind turbine; shutting down the wind turbine.

In particular, the setting system may include a pitch setting arrangement for setting the pitch angles of the one or more rotor blades. Additionally or alternatively, the setting system includes an electrical power output setting arrangement for setting the electrical power output generated by the wind turbine.

In the case that the wind turbine includes several rotor blades, pitch angles of all rotor blades may be changed, for example, simultaneously or collectively, respectively.

By way of example, changing the pitch angle includes changing, particularly increasing, the minimum allowed value of the pitch angle. Increasing the minimum allowed pitch angle ensures that the actual pitch angle cannot go below a certain threshold. For example, if the minimum allowed pitch angle is increased from 5° to 8° but the pitch angle setpoint is set to be 10, then increasing the minimum allowed pitch angle would not change the actual pitch angle.

For instance, changing the electrical power output includes changing the power setting value at the main converter. In particular, the maximum value of electrical power is changed (decreased). The main converter influences the torque of the drive train.

According to at least one embodiment, the first trigger information is representative of whether the torsional movement of at least one rotor blade exceeds, besides the first threshold, a critical threshold. That is, the critical threshold is greater than the first threshold. If the critical threshold is also exceeded, the first measure is shutting down the wind turbine. In this case, the step of providing the second trigger information and the herein specified subsequent steps are not executed, for example. By way of example, the step of providing the second trigger information is only executed if the first trigger information was/is representative of the torsional movement of at least one rotor blade to exceed the first threshold but to be below the critical threshold.

Next, the computer program, the computer-readable data carrier and the control device are specified.

According to an embodiment, the computer program includes instructions which, when the program is executed by a computer, cause the computer to carry out the method for operating a wind turbine according to any one of the embodiments described herein.

According to an embodiment, the computer-readable data carrier has the computer program stored thereon.

According to an embodiment, the control device includes at least one processor and/or at least one programmable logic controller, plc for short, configured to perform the method for operating a wind turbine according to any one of the embodiments described herein. The control device may be a computer, for example. The control device may be part of the wind turbine or may be an external device which is, for example, several km away from the wind turbine, like a computer in a control station (remote control). For example, the control device is configured to communicate with the wind turbine or components thereof via a wire or wirelessly.

Next, the control system for operating a wind turbine is specified. The control system is, in particular, configured to perform the method according to any one of the embodiments described herein. Therefore, all features disclosed for the method are also disclosed for the control system and vice versa.

According to an embodiment, the control system is a control system for operating a wind turbine which has a rotor with at least one rotor blade and a setting system for changing the operation of the wind turbine. The control system includes at least one sensor system configured to take measurements with the help of which it is determinable whether a torsional movement of at least one rotor blade exceeds a threshold. The control system further includes the control device as specified herein. The control device is signally connectable or connected to the at least one sensor system in order to provide the control device with the measurements of the at least one sensor system. The control device is signally connectable or connected to the setting system in order to provide the setting system with the first output signal of the control device so that the setting system changes the operation of the wind turbine depending on the first output signal.

For example, the at least one sensor system is signally connectable or is signally connected with the control device via a wire or wirelessly. The at least one sensor system and/or the control device may be part of the wind turbine, that is, may be integrated into the wind turbine, or may be external. The control device may be signally connected or connectable to the setting system via a wire or wirelessly.

Accordingly, the control device may include an interface for receiving data from the at least one sensor system and an interface for sending the output signal to the setting system.

The setting system may be part of the control system. The setting system includes, for example, a pitch setting arrangement and/or an electrical power output setting arrangement. For example, the pitch setting arrangement includes at least one actuator for each of the rotor blades, wherein each actuator is configured to change and/or set the pitch angle of the respective rotor blade. The pitch setting arrangement may be configured to individually or collectively change the pitch angles of the rotor blades. The setting system may operate as an open-loop system (that is, no feedback loop).

According to a further embodiment, the control system includes the first sensor system and/or the second sensor system and/or the third sensor system and/or the fourth sensor system and/or the fifth sensor system.

Next, the wind turbine is specified.

According to an embodiment, the wind turbine includes a rotor with at least one rotor blade, a setting system for changing the operation of the wind turbine and the control system according to any one of the embodiments described herein. The setting system of the wind turbine may be the above-defined setting system.

BRIEF DESCRIPTION OF DRAWINGS

The invention will now be described with reference to the drawings wherein.

DETAILED DESCRIPTION

Figure 1:
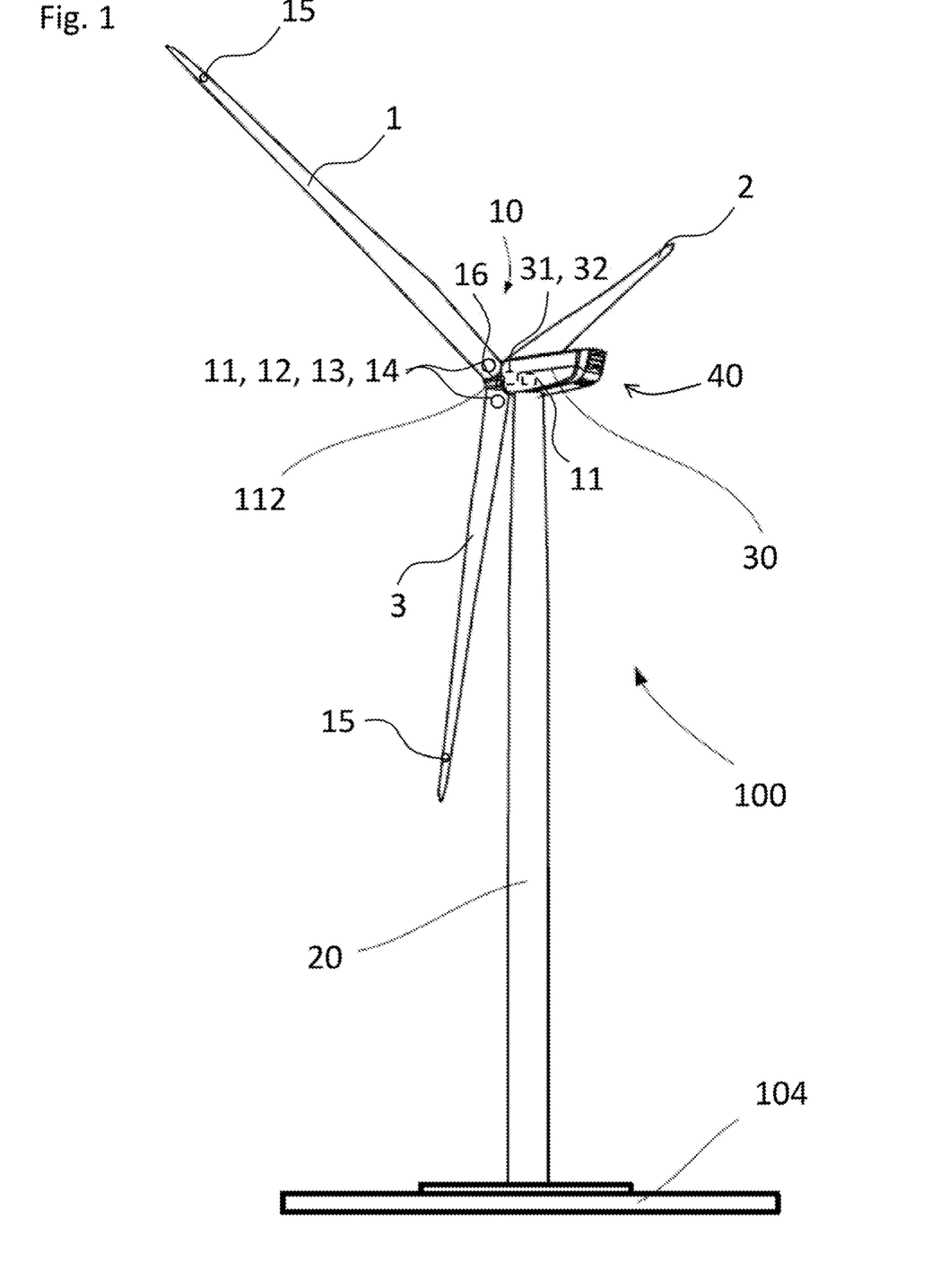
FIG. 1 shows an embodiment of a wind turbine.

FIG. 1 shows a schematic view of an embodiment of a wind turbine 100 which includes a tower 20. The tower 20 is fixed to the ground by means of a foundation 104. At one end of the tower 20, opposite to the ground, a nacelle is rotatably mounted. The nacelle 106 includes, for example, a generator which is coupled to a rotor 10 via a gearbox (not shown). The rotor 10 includes three (wind turbine) rotor blades 1, 2, 3, which are arranged on a rotor hub 112, the rotor hub 112 being connected to a rotor shaft (not shown).

During operation, the rotor 10 is set in rotation by an air flow, for example wind. This rotational movement is transmitted to the generator via the drive train including, inter alia, the rotor shaft and the gearbox. The generator converts the mechanical energy of the rotor 10 into electrical energy.

In order to control the operation of the wind turbine 100, the wind turbine 100 includes a setting system 31, 32. The setting system 31, 32 includes a pitch setting arrangement 31 which is configured to set the pitch angles $\beta\_1, \beta\_2, \beta\_3, \beta\_i$ for short, of the rotor blades 1, 2, 3. The pitch setting arrangement 31 is configured to set the pitch angle β_i of each rotor blade 1, 2, 3. For example, the pitch setting arrangement 31 includes at least one actuator for each rotor blade 1, 2, 3 via which an electrical signal is translated into a mechanical movement of the respective rotor blade 1, 2, 3 about its longitudinal axis.

The setting system 31, 32 further includes an electrical power output setting arrangement 32 which is configured to change the power output at the main converter of the wind turbine 100. The speed of rotation of the rotor 10 can be changed with the help of the pitch setting arrangement 31 and/or the power output setting arrangement 32.

The wind turbine 100 further includes a control system 40 which is configured to operate the wind turbine 100. The control system 40 includes a first 11, a second 12, a third 13, a fourth 14, a fifth 15 and a sixth 16 sensor system as well as a control device 30.

The first sensor system 11 is configured to measure the pitch angles β_i of the rotor blades 1, 2, 3. For example, the first sensor system 11 includes at least three encoder sensors, like optical or magnetic encoder sensors, wherein each rotor blade 1, 2, 3 is assigned at least one of these encoder sensors. With the help of the encoder sensors, the pitch angle β_i of each rotor blade 1, 2, 3 can be determined as a function of time, for example.

The second sensor system 12 is configured to measure the torsional bending moments M_x,1, M_x,2, M_x,3, M_x,i for short, acting on the rotor blades 1, 2, 3. The second sensor system 12 includes, for example, at least one strain sensor for each rotor blade 1, 2, 3, wherein the strain sensor is coupled to the respective rotor blade 1, 2, 3. The strain sensors may be fiber optic strain sensors, for example. The measurements of the strain sensors may be used to estimate/determine the torsional bending moment M_x,i acting on the respective rotor blade 1, 2, 3.

The third 13 and the fourth 14 sensor systems are configured to measure the edgewise bending moments M_y,1, M_y,2, M_y,3, M_y,i for short, acting on the rotor blades 1, 2, 3 and the flapwise bending moments M_z,1, M_z,2, M_z,3, M_z,i for short, acting on the rotor blades 1, 2, 3, respectively. The third sensor system 13 includes, for example, at least one strain sensor for each rotor blade 1, 2, 3, wherein the strain sensors are coupled to the respective rotor blade 1, 2, 3. Likewise, the fourth sensor system 14 may include at least one strain sensor for each rotor blade 1, 2, 3, wherein the strain sensors are coupled to the respective rotor blade 1, 2, 3. The strain sensors may be fiber optic strain sensors, for example. The measurements of the strain sensors may be used to estimate/determine the edgewise bending moment M_y,i and the flapwise bending moment M_z,i acting on the respective rotor blade 1, 2, 3.

The fifth sensor system 15 is configured to measure the angular accelerations of the rotor blades 1, 2, 3. The fifth sensor system 15 includes, for example, at least one angular acceleration sensor, like a gyroscopic accelerometer, for each rotor blade 1, 2, 3. The acceleration sensor is coupled to the respective rotor blade at the tip end of the rotor blade, for example. The measurements of the angular acceleration sensor may be used to estimate/determine the angular acceleration acting on the respective rotor blade 1, 2, 3.

The sixth sensor system 16 is configured to measure the electrical power output of the wind turbine and/or the wind speed at the wind turbine. For example, the sixth sensor system 16 includes at least one voltage sensor and/or at least one current sensor for determining the electrical power output. Additionally or alternatively, the sixth sensor system 16 may include at least one cup-anemometer and/or at least one ultrasonic anemometer for measuring the wind speed.

The measurements of the different sensor systems 11, 12, 13, 14, 15 may be used individually or collectively in order to determine trigger information, as will be further explained below.

The control device 30 of the wind turbine 100 includes, for example, at least one processor. It may be located in the nacelle. The control device 30 is signally coupled to the sensor systems 11 to 16 and the setting system 31, 32 so that it can communicate with the systems 11 to 16, 31, 32. The measurement signals from the sensor systems 11 to 16 are processed by the control device 30 and, depending on this, one or more output signals are possibly transmitted to the setting system 31, 32 in order to adjust the operation of the wind turbine 100.

Figure 2:
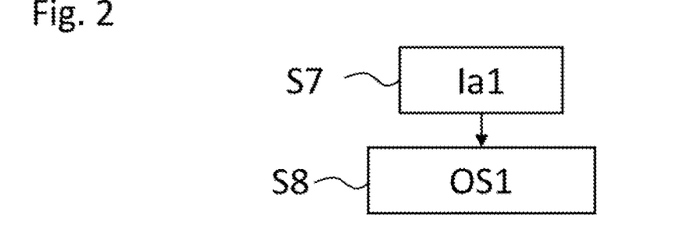
FIGS. 2 to 4 show flowcharts of embodiments of the method for operating a wind turbine.

FIG. 2 shows a first embodiment of the method for operating a wind turbine. In a step S7, a first trigger information Ia1 is provided. The first trigger information Ia1 is representative of whether the torsional movement of at least one of the rotor blades 1, 2, 3 exceeds a first threshold. If this is the case, that is, if the first trigger information Ia1 is representative of at least one of the rotor blades 1, 2, 3 exceeding the first threshold, a first output signal OS is generated in a step S8. The first output signal OS1 is configured to cause the setting system 31, 32 to change the operation of the wind turbine 100 in order to reduce the torsional movement of the at least one rotor blade 1, 2, 3.

Figure 3:
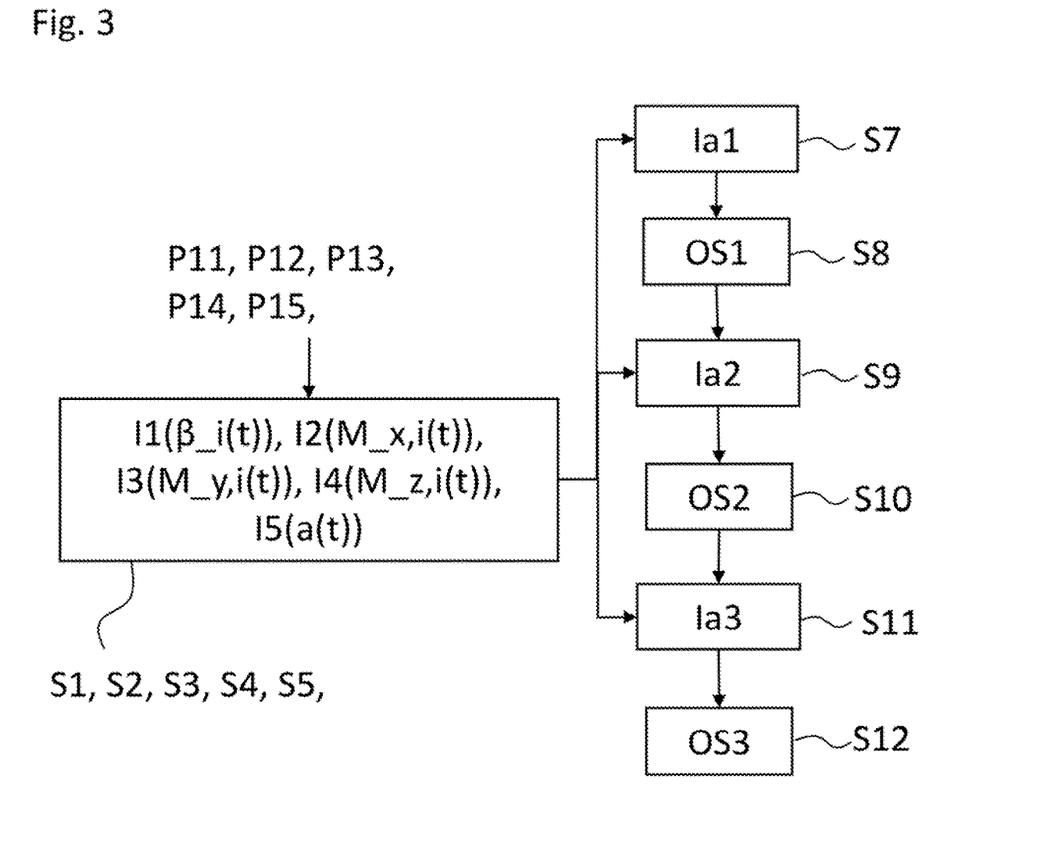

FIG. 3 shows a second embodiment of the method for operating a wind turbine. Here, first I1, second I2, third I3, fourth I4 and fifth I5 base information is provided (steps S1 to S5). The first base information I1 is representative of the pitch angles β_i of the rotor blades 1, 2, 3 as a function of time. The second base information I2, the third base information I3 and the fourth base information I4 are representative of the torsional blade bending moments M_x,i acting on the rotor blades 1, 2, 3, the edgewise bending moments M_y,i acting on the rotor blades 1, 2, 3 and the flapwise bending moments M_z,i acting on the rotor blades, in each case as a function of time. The fifth base information I5 is representative of the angular accelerations of the rotor blades 1, 2, 3 as a function of time.

The first base information I1 is determined depending on measurements P11 taken with the help of the first sensor system 11. The second base information I2 is determined depending on the measurements P12 taken with the help of the second sensor system 12. The third base information I3 is determined depending on the measurements P13 taken with the help of the third sensor system 13. The fourth base information I4 is determined depending on measurements P14 taken with the help of the fourth sensor system 14. The fifth base information I5 is determined depending on measurements P15 taken with the help of the fifth sensor system 15.

Depending on the base information I1 to I5, the first trigger information Ia1 being representative of whether the torsional movement of at least one rotor blade 1, 2, 3 exceeds the first threshold is determined (step S7). Indeed, from all of this base information I1 to I5, information about the torsional movements of at the rotor blades 1, 2, 3 can be extracted.

If the first trigger information Ia1 is representative of the torsional movement of at least one rotor blade 1, 2, 3 exceeding the first threshold, the first output signal OS1 is generated (step S8). The first output signal OS1 is configured to cause the setting system 31, 32 to execute a first measure for reducing the torsional movements of the rotor blades 1, 2, 3. For example, the first measure is a change, particularly an increase, of the pitch angles $\beta\_i$ of the rotor blades 1, 2, 3. For this purpose, the pitch setting arrangement 31 may be used.

In step S9, second trigger information Ia2 is determined, again depending on the base information I1 to I5. However, in this case, the base information I1 to I5 is representative of a later moment in time than the base information I1 to I5 used for determining the first trigger information Ia1 having caused the first output signal OS1.

If the second trigger information Ia2 is representative of the torsional movement of at least one rotor blade 1, 2, 3 exceeding a second threshold, a second output signal OS2 is generated in the step S10. The second threshold may be different from the first threshold, for example, may be higher, or may be the same as the first threshold. The second output signal OS2 is configured to cause the setting system 31, 32 to execute a second measure for reducing the torsional movements of the rotor blades 1, 2, 3. For example, the second measure is a reduction of the electric power output of the wind turbine 100. The second measure may be executed with the help of the power output setting arrangement 32.

In a step S11, third trigger information Ia3 is determined. The third trigger information Ia3 is representative of whether the torsional movement of least one rotor blade 1, 2, 3 exceeds a third threshold after the second measure has been executed. The third threshold may be the same as the first and/or the second threshold or may be different from the first and/or the second threshold. The third trigger information Ia3 is again determined depending on the base information I1 to I5. However, in this case, the base information I1 to I5 is representative of a later moment in time than the base information I1 to I5 used for determining the second trigger information Ia2 which has caused the second output signal OS2.

If the third trigger information Ia3 is representative of the torsional movement of least one rotor blade 1, 2, 3 to exceed the third threshold, a step S12 is executed in which a third output signal OS3 is generated. The third output signal OS3 is configured to cause the setting system 31, 32 to execute a third measure for reducing the torsional movements of the rotor blades 1, 2, 3. For example, the third measure shuts down the wind turbine. This may be done with the help of the pitch setting arrangement 31 and/or the power output setting arrangement 32.

In FIG. 3, the trigger information Ia1, 1*a*2, Ia3 has been determined depending on five different pieces of base information I1 to I5. However, it can be also sufficient to determine the trigger information Ia1, Ia2, Ia3 depending on only one or only a few of these pieces of base information I1 to I5.

Figure 4:
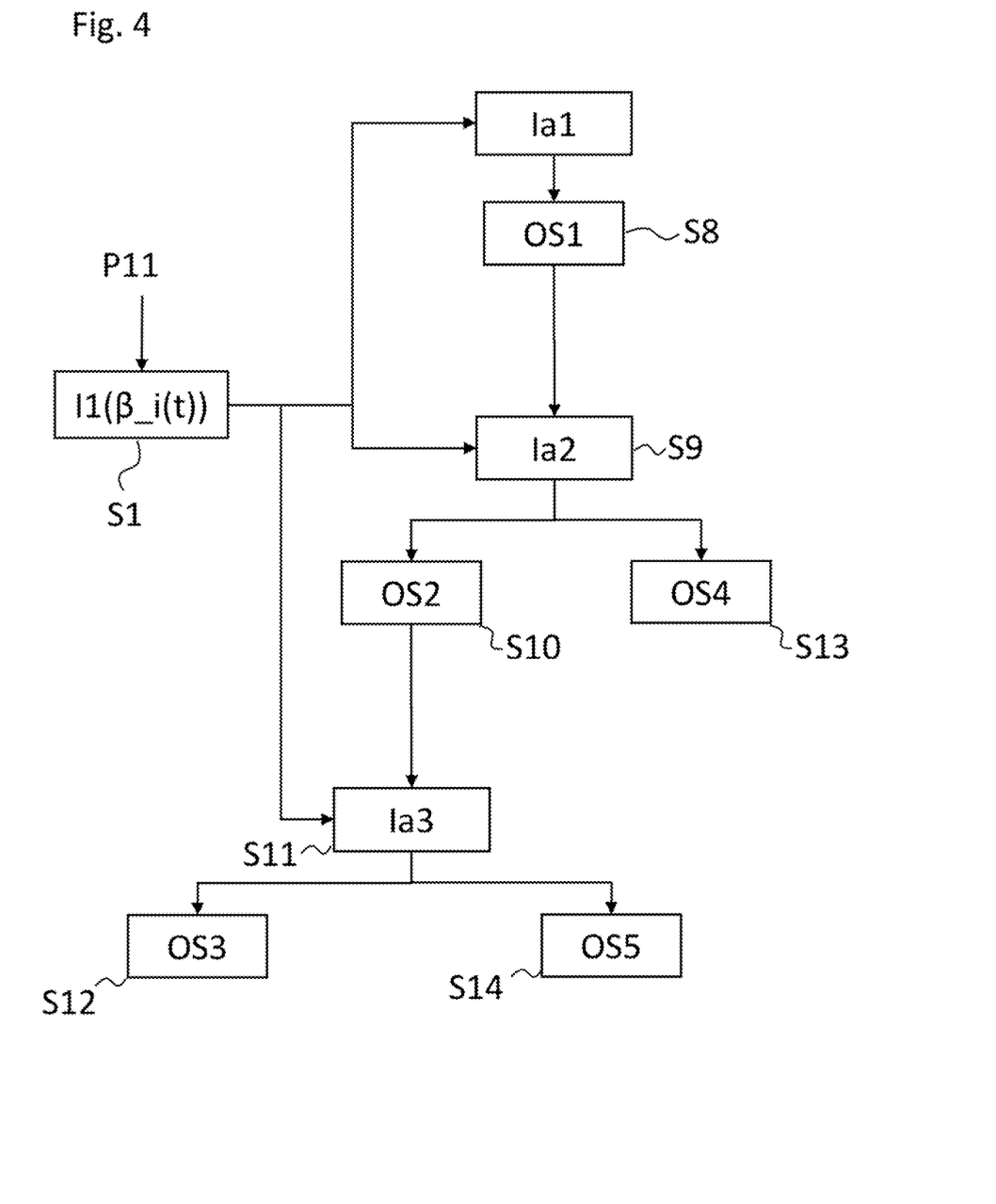

FIG. 4 shows a further embodiment of the method for operating the wind turbine 100. In this case, the first Ia1, the second Ia2 and the third Ia3 trigger information are each exemplarily determined only depending on the first base information I1. However, every other of the second I2 to the fifth I5 base information could be used instead. Here, the second threshold is assumed to be greater than the first threshold and the third threshold is assumed to be greater than the second threshold.

In FIG. 4, the second trigger information Ia2 is also representative of whether the torsional movements of all rotor blades 1, 2, 3 fall below the first threshold after the first measure has been executed. If this is the case, a step S13 is executed, in which a fourth output signal OS4 is generated which is configured to cause the setting system 31, 32 to execute a fourth measure opposite to the first measure. That is, the fourth measure at least partially cancels the first measure. For example, the fourth measure is a reduction of the pitch angles $\beta\_i$.

In the case that step S10 is executed, the third trigger information Ia3 is determined. The third trigger information Ia3 is also representative of whether torsional movements of all rotor blades 1, 2, 3 fall below the second threshold after the second measure has been executed. If this is the case, a step S14 is executed in which a fifth output signal OS5 is generated which is configured to cause the setting system 31, 32 to execute a fifth measure opposite to the second measure. That is, the fifth measure at least partially cancels the second measure. For example, the fifth measure is an increase in the electrical power output of the wind turbine.

Figure 5:
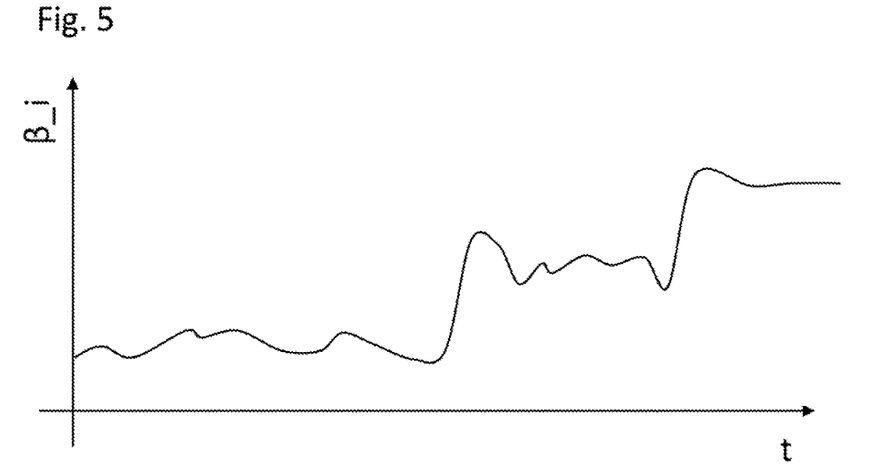
FIGS. 5 to 8 show simulations illustrating the method for operating a wind turbine; and, FIG. 9 shows an embodiment of the control system and the control device.

FIG. 5 shows simulations for the pitch angle $\beta\_i$ of one of the rotor blades 1, 2, 3 as a function of time t. For example, FIG. 5 illustrates the first base information I1 determined with the help of the first sensor system 11. As can be seen, the pitch angle $\beta\_i$ fluctuates strongly over time.

Figure 6:
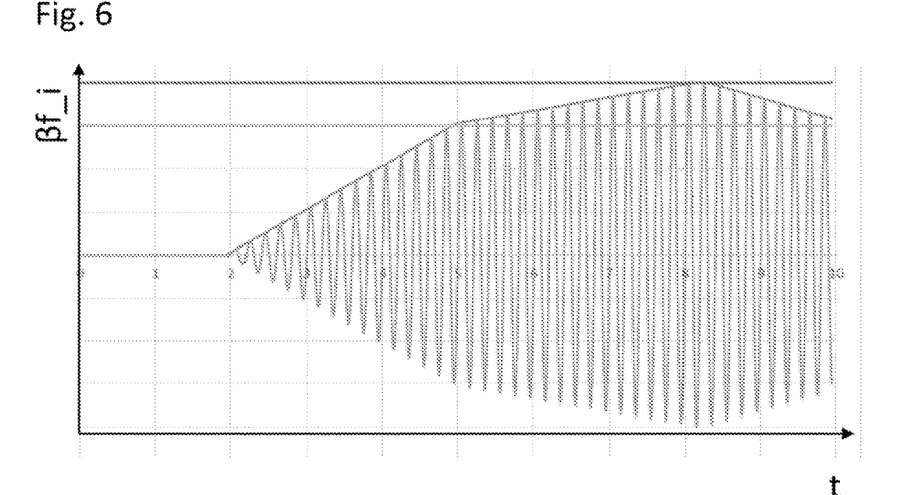

FIG. 6 shows the pitch angle $\beta f\_i$ as a function of time t after the signal of FIG. 5 has been filtered with the help of a bandpass filter. The bandpass filter is chosen such that it extracts an oscillation of the pitch angle $\beta\_i$ of the rotor blade with the torsional eigenfrequency of the rotor blade.

Figure 7:
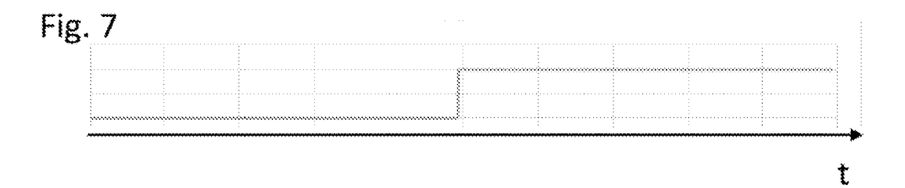

FIG. 6 shows that the amplitude of the oscillation with the torsional eigenfrequency of the rotor blade increases with increasing time. The lower horizontal line shown in FIG. 6 indicates a first oscillation threshold. As soon as the amplitude passes this first oscillation threshold, the first trigger information Ia1 is determined to be representative of the torsional movement of the rotor blade exceeding the first threshold. Accordingly, the first output signal is generated and the first measure is executed, as indicated in FIG. 7. Here, the first measure is collective increase of the pitch angles $\beta\_i$ of the rotor blades 1, 2, 3 as also reflected in FIG. 5.

Figure 8:
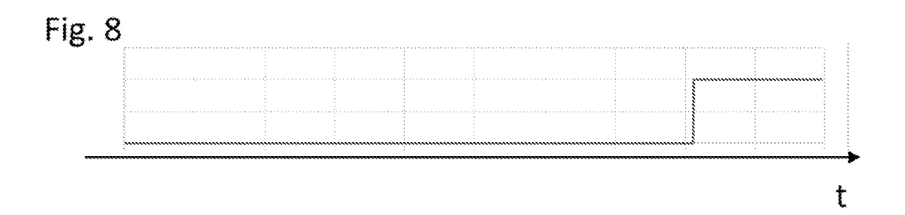

FIG. 6 shows that the execution of the first measure reduces the speed with which the amplitude of the oscillation of the pitch angle $\beta\_i$ increases, but does not result in a decrease of this amplitude. At a later moment in time, the amplitude exceeds a second oscillation threshold (indicated by the further horizontal line). The second trigger information is then determined to be representative of the torsional movement of the rotor blade exceeding the second threshold and, accordingly, the second output signal is generated. The second output signal induces the execution of the second measure. Execution of the second measure (see FIG. 8) finally results in the desired reduction of the amplitude of the pitch angle oscillation (see FIG. 6). The second measure is, for example, the shutdown of the wind turbine.

Figure 9:
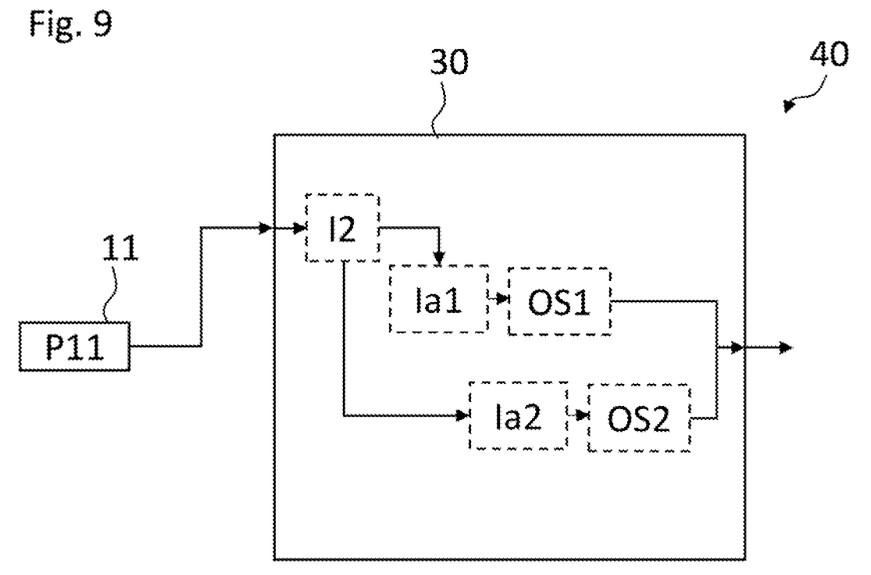

FIG. 9 shows an embodiment of the control system 40. The control system 40 includes the sensor system 11, with which the measurements P11 can be taken. These measurements P11 are provided to the control device 30 which performs the method steps of the method and, possibly, delivers output signals OS1, OS2, which the control system 40 then transmits to the setting system 31, 32 of the wind turbine 100 in order to adjust the operation.

It is understood that the foregoing description is that of the preferred embodiments of the invention and that various changes and modifications may be made thereto without departing from the spirit and scope of the invention as defined in the appended claims.

REFERENCE SIGNS

1 first rotor blade
2 second rotor blade 3 third rotor blade
10 rotor
11 first sensor system
12 second sensor system
13 third sensor system
14 fourth sensor system
15 fifth sensor system
16 sixth sensor system
20 tower
30 control device
31 pitch setting arrangement
32 power output setting arrangement
40 control system
100 wind turbine
104 foundation
106 nacelle
112 rotor hub
I1 first base information
I2 second base information
I3 third base information
I4 fourth base information
I5 fifth base information
I6 sixth base information
Ia1 first trigger information
Ia2 second trigger information
Ia3 third trigger information
OS1 first output signal
OS2 second output signal
OS3 third output signal
$\beta\_i$ pitch angle
$\beta f\_i$ filtered pitch angle
$M\_x,i$ torsional bending moment
$M\_y,i$ edgewise bending moment
$M\_z,i$ flapwise bending moment
P11 to P15 measurements
S1 to S14 method steps

The invention claimed is:

1. A method for operating a wind turbine including a rotor with a rotor blade and a setting system configured to change an operation of the wind turbine, the method comprising:
providing first trigger information which is representative of whether a torsional vibration of the rotor blade exceeds a threshold;
generating a first output signal when the torsional vibration of the rotor blade exceeds the threshold wherein the first output signal is configured to cause the setting system to change the operation of the wind turbine in order to reduce the torsional vibration of the rotor blade;
wherein at least one of:
the method further comprises providing second base information which is representative of a torsional bending moment acting on the rotor blade; wherein the first trigger information is determined in dependence upon the second base information; wherein said determining of the first trigger information includes applying at least one filter to the second base information in order to extract an oscillation of the torsional bending moment of the rotor blade with a torsional eigenfrequency, and, determining whether an amplitude of the oscillation with the torsional eigenfrequency exceeds a threshold;
the method further comprises providing at least one of third base information and fourth base information which are respectively representative of at least one of an edgewise bending moment and a flapwise bending moment acting on the rotor blade, wherein the first trigger information is determined in dependence upon at least one of the third and the fourth information, wherein the determining of the first trigger information includes applying at least one filter to at least one of the third base information and the fourth base information in order to extract an oscillation of at least one of the edgewise bending moment and the flapwise bending moment of the rotor blade with a torsional eigenfrequency of the rotor blade; and, determining whether an amplitude of the oscillation with the torsional eigenfrequency exceeds a threshold;
the method further comprises providing a fifth base information which is representative of an angular acceleration of the rotor blade, wherein the first trigger information is determined depending on the fifth base information, wherein the fifth base information is determined in dependence upon measurements taken with the help of a fifth sensor system, wherein the fifth sensor system includes at least one acceleration sensor for measuring an angular acceleration of the rotor blade; said determining of the first trigger information includes applying at least one filter to the fifth base information in order to extract an oscillation of the angular acceleration of the rotor blade with a torsional eigenfrequency; and, determining whether an amplitude of the oscillation with the torsional eigenfrequency exceeds a threshold; and,
the setting system is configured to execute at least two different measures for reducing the torsional vibration of the rotor blade; the first output signal is configured to cause the setting system to execute a first measure for reducing the torsional vibration of the rotor blade; the method further comprises providing a second trigger information which is representative of whether the torsional vibration of the rotor blade exceeds the threshold after the first measure has been executed; and, generating, if the torsional vibration exceeds the threshold, a second output signal configured to cause the setting system to execute a second measure for reducing the torsional vibration of the rotor blade, wherein each of the first measure and the second measure is one of: changing the pitch angle of the rotor blade, changing the speed of rotation of the rotor without stopping the rotation of the rotor, changing the electrical power output of the wind turbine, and shutting down the wind turbine, wherein the first measure and the second measure differ from each other.

2. The method of claim 1 further comprising: providing first base information which is representative of a pitch angle of the rotor blade, wherein the first trigger information is determined in dependence upon the first base information.

3. The method of claim 2, wherein:
the first base information is determined in dependence upon measurements taken with help of a first sensor system; and,
the first sensor system includes at least one encoder sensor.

4. The method of claim 2, wherein:
the determining of the first trigger information comprises:
applying at least one filter to the first base information in order to extract an oscillation of the pitch angle of the rotor blade with a torsional eigenfrequency of the rotor blade; and, determining whether an amplitude of the oscillation with the torsional eigenfrequency exceeds a threshold.

5. The method of claim 1, wherein:
the second base information is determined in dependence upon measurements taken with help of a second sensor system; and,
the second sensor system includes at least one strain sensor for measuring the torsional bending moment of the rotor blade.

6. The method of claim 1, wherein:
at least one of the third base information and the fourth base information are determined depending on measurements taken with the help of at least one of a third sensor system and a fourth sensor system; and,
at least one of:
the third sensor system includes at least one strain sensor for measuring the edgewise bending moment of the rotor blade; and,
the fourth sensor system includes at least one strain sensor for measuring the flapwise bending moment of the rotor blade.

7. A computer program for operating a wind turbine including a rotor with a rotor blade and a setting system configured to change an operation of the wind turbine, the computer program comprising:
instructions stored on a non-transitory computer readable medium;
said instructions being configured, when the computer program is executed by a computer, cause the computer to:
provide first trigger information which is representative of whether a torsional vibration of the rotor blade exceeds a threshold; and,
generate a first output signal when the torsional vibration of the rotor blade exceeds the threshold wherein the first output signal is configured to cause the setting system to change the operation of the wind turbine in order to reduce the torsional vibration of the rotor blade
wherein at least one of:
said instructions are further configured, when the computer program is executed by the computer, to cause the computer to provide second base information which is representative of a torsional bending moment acting on the rotor blade; wherein the first trigger information is determined in dependence upon the second base information; wherein the determining of the first trigger information includes applying at least one filter to the second base information in order to extract an oscillation of the torsional bending moment of the rotor blade with a torsional eigenfrequency, and, determining whether an amplitude of the oscillation with the torsional eigenfrequency exceeds a threshold;
said instructions are further configured, when the computer program is executed by the computer, to cause the computer to provide at least one of third base information and fourth base information which are respectively representative of at least one of an edgewise bending moment and a flapwise bending moment acting on the rotor blade, wherein the first trigger information is determined in dependence upon at least one of the third and the fourth information, wherein the determining of the first trigger information includes applying at least one filter to at least one of the third base information and the fourth base information in order to extract an oscillation of at least one of the edgewise bending moment and the flapwise bending moment of the rotor blade with a torsional eigenfrequency of the rotor blade; and, determining whether an amplitude of the oscillation with the torsional eigenfrequency exceeds a threshold;
said instructions are further configured, when the computer program is executed by the computer, to cause the computer to provide a fifth base information which is representative of an angular acceleration of the rotor blade, wherein the first trigger information is determined depending on the fifth base information, wherein the fifth base information is determined in dependence upon measurements taken with the help of a fifth sensor system, wherein the fifth sensor system includes at least one acceleration sensor for measuring an angular acceleration of the rotor blade; said determining of the first trigger information includes applying at least one filter to the fifth base information in order to extract an oscillation of the angular acceleration of the rotor blade with a torsional eigenfrequency; and, determining whether an amplitude of the oscillation with the torsional eigenfrequency exceeds a threshold; and,
the setting system is configured to execute at least two different measures for reducing the torsional vibration of the rotor blade; the first output signal is configured to cause the setting system to execute a first measure for reducing the torsional vibration of the rotor blade; the method further comprises providing a second trigger information which is representative of whether the torsional vibration of the rotor blade exceeds the threshold after the first measure has been executed; and, generating, if the torsional vibration exceeds the threshold, a second output signal configured to cause the setting system to execute a second measure for reducing the torsional vibration of the rotor blade, wherein each of the first measure and the second measure is one of: changing the pitch angle of the rotor blade, changing the speed of rotation of the rotor without stopping the rotation of the rotor, changing the electrical power output of the wind turbine, and shutting down the wind turbine, wherein the first measure and the second measure differ from each other.

8. A non-transitory, computer-readable data storage medium having the computer program of claim 7 stored thereon.

9. A control device comprising a processor and a non-transitory computer readable storage medium having the computer program of claim 7 stored thereon.

10. A control system for operating a wind turbine having a rotor with a rotor blade and a setting system for changing an operation of the wind turbine, the control system comprising:
at least one sensor system configured to take measurements with help of which it is determinable whether a torsional vibration of the rotor blade exceeds a threshold;
a control device including a processor and a non-transitory computer-readable storage medium having program code stored thereon;
said program code being configured, when executed by said processor, to provide first trigger information which is representative of whether the torsional vibration of the rotor blade exceeds the threshold, and generate a first output signal when the torsional vibration of the rotor blade exceeds the threshold wherein said first output signal is configured to cause the setting system to change the operation of the wind turbine in order to reduce the torsional vibration of the rotor blade;

said control device being signally connectable to said at least one sensor system in order to provide said control device with the measurements of said at least one sensor system; and, said control device being signally connectable to the setting system in order to provide the setting system with said first output signal of said control device so that the setting system changes the operation of the wind turbine in dependence upon said first output signal wherein at least one of:

said program code is further configured, when the computer program is executed by the computer, to cause the computer to provide second base information which is representative of a torsional bending moment acting on the rotor blade; wherein the first trigger information is determined in dependence upon the second base information; wherein the determining of the first trigger information includes applying at least one filter to the second base information in order to extract an oscillation of the torsional bending moment of the rotor blade with a torsional eigenfrequency, and, determining whether an amplitude of the oscillation with the torsional eigenfrequency exceeds a threshold;

said program code is further configured, when the computer program is executed by the computer, to cause the computer to provide at least one of third base information and fourth base information which are respectively representative of at least one of an edgewise bending moment and a flapwise bending moment acting on the rotor blade, wherein the first trigger information is determined in dependence upon at least one of the third and the fourth information, wherein the determining of the first trigger information includes applying at least one filter to at least one of the third base information and the fourth base information in order to extract an oscillation of at least one of the edgewise bending moment and the flapwise bending moment of the rotor blade with a torsional eigenfrequency of the rotor blade; and, determining whether an amplitude of the oscillation with the torsional eigenfrequency exceeds a threshold;

said program code is further configured, when the computer program is executed by the computer, to cause the computer to provide a fifth base information which is representative of an angular acceleration of the rotor blade, wherein the first trigger information is determined depending on the fifth base information, wherein the fifth base information is determined in dependence upon measurements taken with the help of a fifth sensor system, wherein the fifth sensor system includes at least one acceleration sensor for measuring an angular acceleration of the rotor blade; said determining of the first trigger information includes applying at least one filter to the fifth base information in order to extract an oscillation of the angular acceleration of the rotor blade with a torsional eigenfrequency; and, determining whether an amplitude of the oscillation with the torsional eigenfrequency exceeds a threshold; and, the setting system is configured to execute at least two different measures for reducing the torsional vibration of the rotor blade; the first output signal is configured to cause the setting system to execute a first measure for reducing the torsional vibration of the rotor blade; the method further comprises providing a second trigger information which is representative of whether the torsional vibration of the rotor blade exceeds the threshold after the first measure has been executed; and, generating, if the torsional vibration exceeds the threshold, a second output signal configured to cause the setting system to execute a second measure for reducing the torsional vibration of the rotor blade, wherein each of the first measure and the second measure is one of: changing the pitch angle of the rotor blade, changing the speed of rotation of the rotor without stopping the rotation of the rotor, changing the electrical power output of the wind turbine, and shutting down the wind turbine, wherein the first measure and the second measure differ from each other.

11. A wind turbine comprising:

a rotor with a rotor blade;

a setting system for changing an operation of the wind turbine;

the control system of claim 10.

* * * * *